No. 657,521. Patented Sept. II, 1900.
J. DAVIE.
EVAPORATING APPARATUS.
(Application filed May 26, 1899.)
(No Model.) 5 Sheets—Sheet 1.
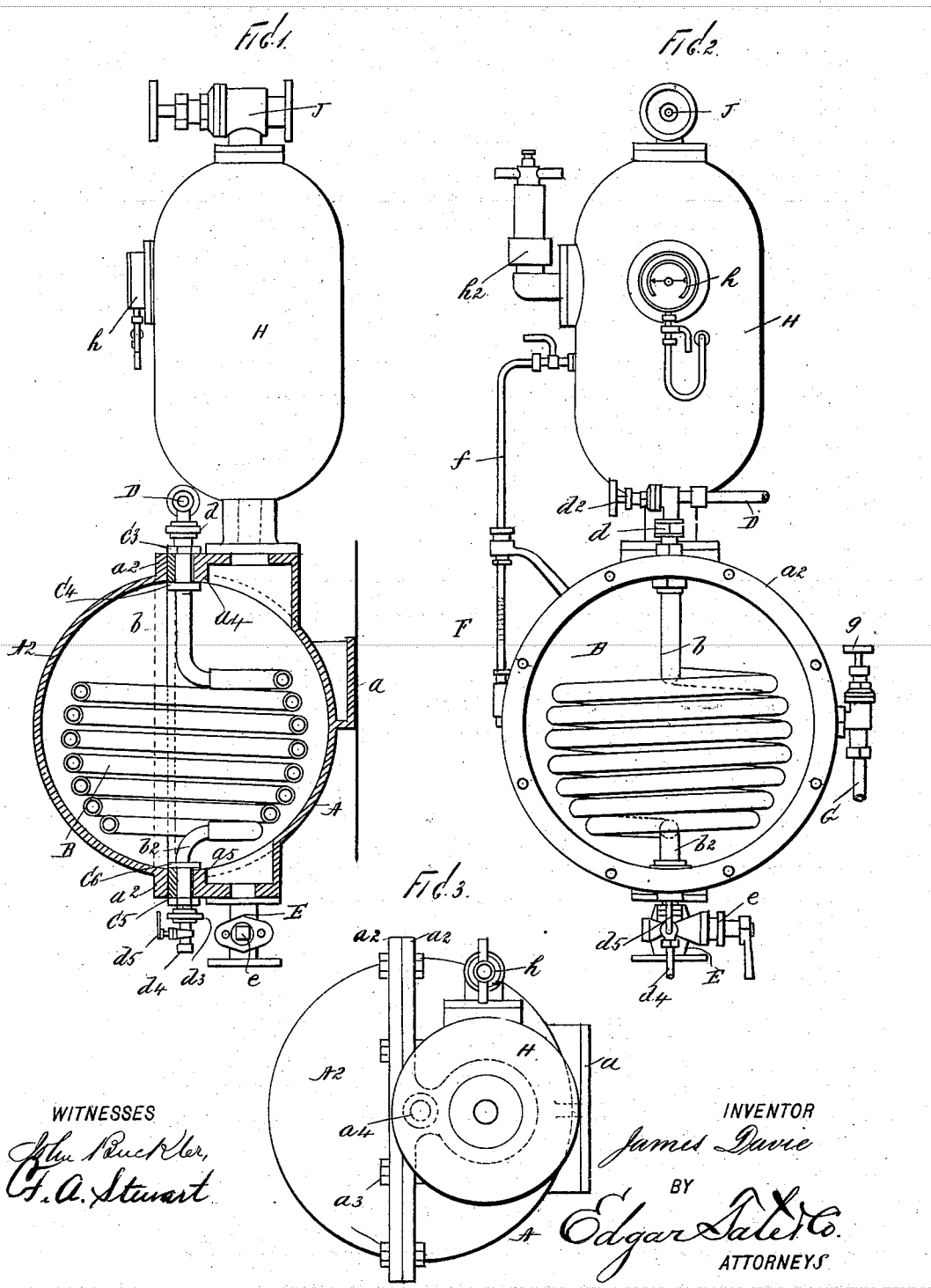

No. 657,521. Patented Sept. 11, 1900.
J. DAVIE.
EVAPORATING APPARATUS.
(Application filed May 26, 1899.)
(No Model.) 5 Sheets—Sheet 2.
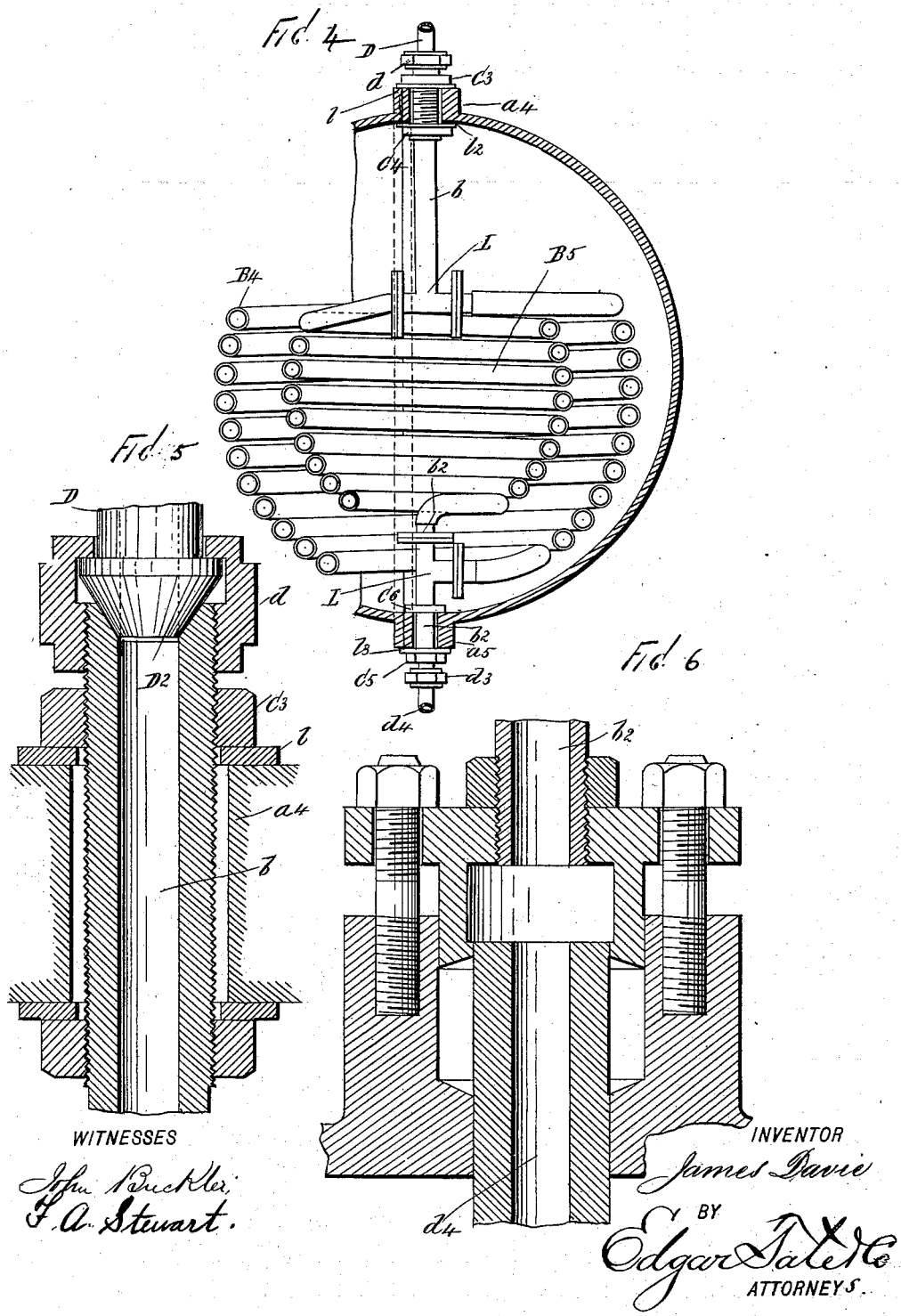

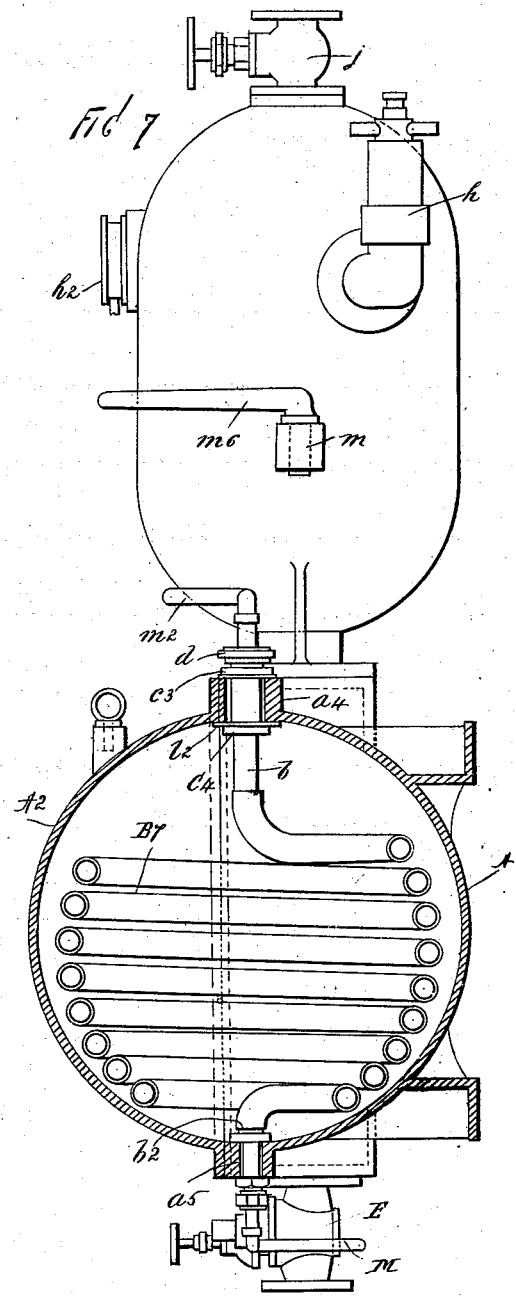

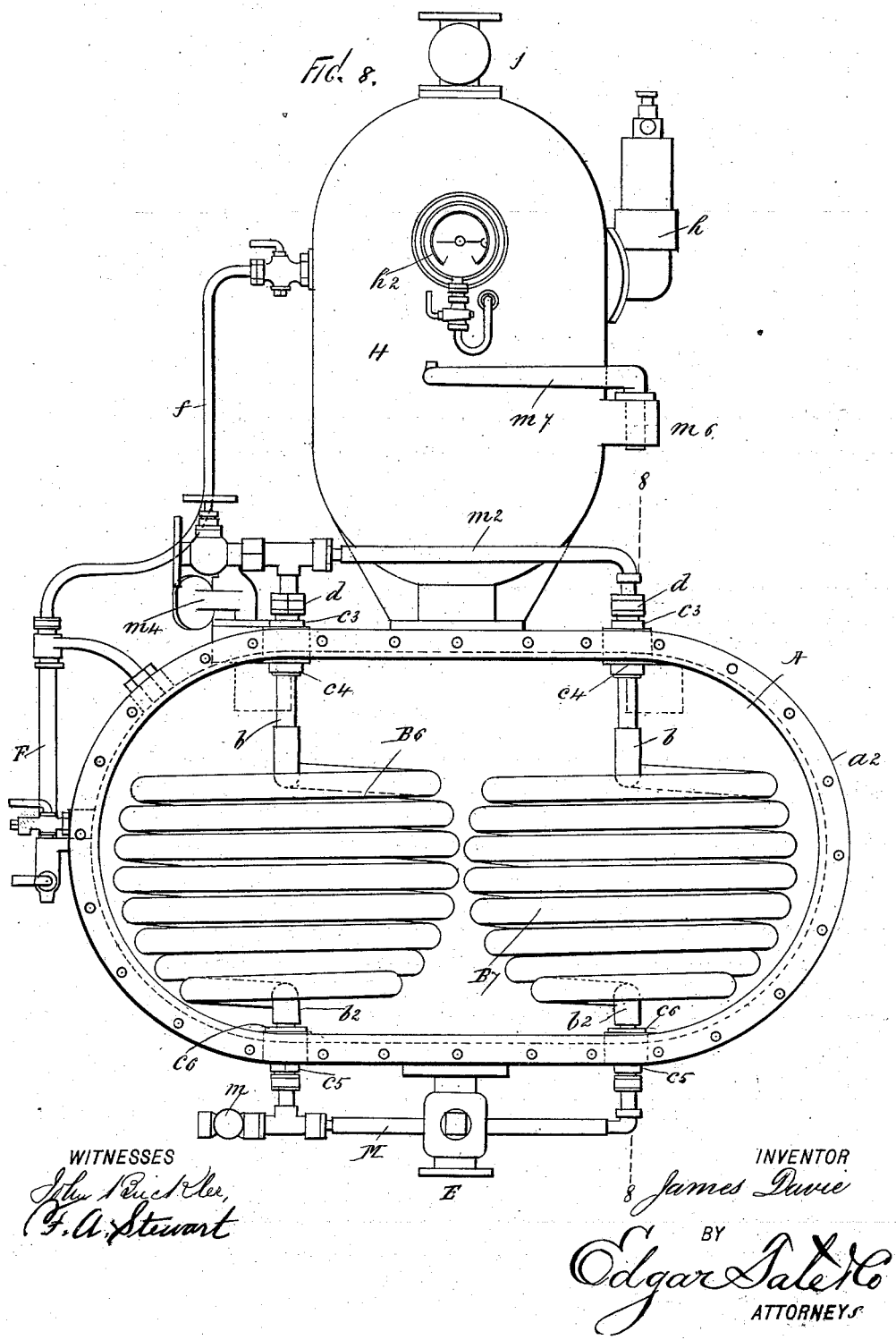

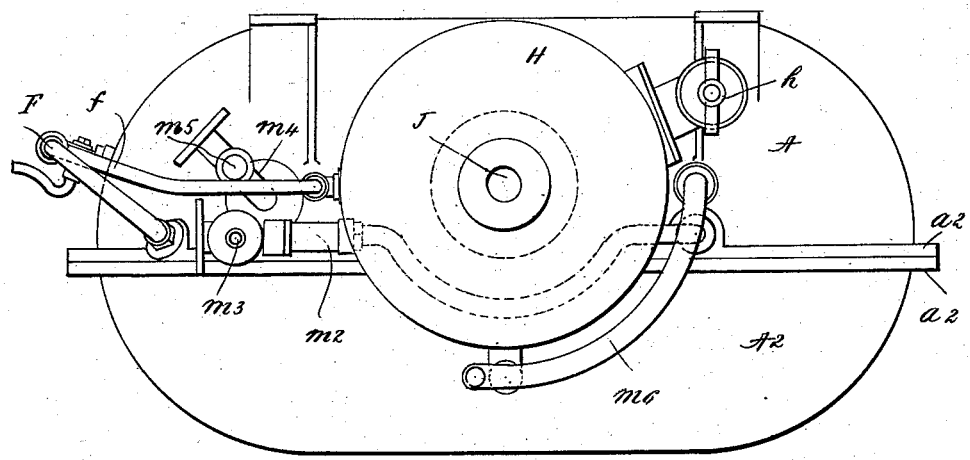

UNITED STATES PATENT OFFICE.

JAMES DAVIE, OF GLASGOW, SCOTLAND.

EVAPORATING APPARATUS.

SPECIFICATION forming part of Letters Patent No. 657,521, dated September 11, 1900.

Application filed May 26, 1899. Serial No. 718,373. (No model.)

*To all whom it may concern:*

Be it known that I, JAMES DAVIE, a subject of the Queen of Great Britain, residing at Crosshill, Glasgow, Scotland, have invented certain new and useful Improvements in Evaporating Apparatus, of which the following is a full and complete specification, such as will enable others skilled in the art to which it appertains to make and use the same.

This invention relates to apparatus for evaporating water or other liquids; and one object thereof is to provide an improved apparatus for this purpose which may be used at sea to evaporate salt water, so as to produce potable water and water for steam-boilers, a further object being to produce a device of this class which may be easily cleaned and which is of great capacity, while occupying but small space, a further object being to provide an apparatus of the class described which may be used wherever such devices are required and for concentrating sugar and for many other and similar purposes; and with these and other objects in view the invention consists in the construction, combination, and arrangement of parts hereinafter described and claimed.

The invention is fully disclosed in the following specification, of which the accompanying drawings form a part, in which—

Figure 1 is a side elevation of one form of my improved evaporating apparatus, the main casing being shown in central vertical section; Fig. 2, a similar view at right angles to Fig. 1 with one side of the main casing removed; Fig. 3, a plan view; Fig. 4, a view similar to Fig. 1, showing a modification, the top portion of the apparatus being removed; Figs. 5 and 6, sectional details of the construction; Fig. 7, a view similar to Fig. 1, showing another modification; Fig. 8, a front view of the apparatus shown in Fig. 7, part of the casing being removed; and Fig. 9, a plan view of said apparatus.

In the drawings forming part of this specification the separate parts of my improvement are designated by letters of reference in each of the views, and in the practice of my invention, as shown in Figs. 1 to 3, inclusive, I provide a main spherical casing composed of two parts A and $A^2$, and the part A is provided with a side bracket $a$, by which it may be secured to a wall or other support, and at the point where the parts of said casing meet they are provided each with a flange $a^2$, by which they are bolted together, as shown at $a^3$, Fig. 3. The part A is provided at the top and bottom thereof with tubular collars $a^4$ and $a^5$, respectively, and within the main casing, composed of the parts A and $A^2$, is placed a steam-coil B, which is also substantially spherical in form, and one end of the pipe is provided with an upwardly-directed portion $b$ and the other with a downwardly-directed portion $b^2$, and these portions may be formed integrally with or separately from and be connected with the main coil B. The end portions $b$ and $b^2$ of the coil B are in line with the vertical axis of the main casing, so that when the coil B is in position in said casing it may be turned on its vertical axis by hand, so as to facilitate the cleaning and scaling of the salt and other defects which have been deposited on the heating-surface. The coil B may be held in position by nuts $C^3$, $C^4$, and $C^5$ or in any desired manner, and the portion $b^2$ of the coil B is preferably provided with a rigid collar $C^6$, and said coil is put in position by removing the nut $C^5$ and unscrewing the nut $C^4$ and letting it drop down on the portion $b$ of the coil B, after which the said portion $b$ is passed upwardly through the collar $a^4$ until the bottom portion $b^2$ can be inserted into the flange $a^2$, when the coil B is let down until it is supported by the collar $C^6$ and the nuts $C^3$, $C^4$, and $C^5$ are screwed into position. A steam-supply pipe D is connected with the coil B through the portion $b$, which is provided with a coupling $d$, and said steam-supply pipe D is provided with a valve $d^2$, Fig. 2, and the lower end of the portion $b^2$ is provided with a coupling $d^3$, with which is connected a drainage-pipe $d^4$, provided with a valve $d^5$.

The bottom of the stationary part of the main casing, composed of the parts A and $A^2$, is provided with a blow-off and drain E, having a valve $e$, and connected with one side of the main casing is a water-gage F, and connected with the opposite side of said casing is a water-supply pipe G, provided with a valve $g$.

Connected with the main casing and preferably mounted on the top thereof is a steam-drum H, provided at the front with a gage $h$, and said steam-drum is placed in communication with the water-gage F by means of a pipe $f$ and is also provided with a safety-valve $h^2$, loaded, preferably, to about twenty pounds of pressure, and at the top of said drum is an exhaust-valve J.

In the practice of my invention the water or liquid to be purified or evaporated is carried into the main casing through the pipe G and valve $g$ by any desired means. The stem is admitted into the coil B by the pipe D, and the feed of said steam is regulated by the valve $d^2$, and this steam heats and evaporates the water in the surrounding main casing, and finally condenses and is drained off through the pipe $d^4$ in the form of exhaust-steam and water of condensation. The water heated in the main casing forms steam which rises and is collected in the steam-drum H and escapes by means of the valve J and is led away to any suitable form of condenser in which it is condensed into purified water or other liquid, according to the class of work which is being performed. The gage F will indicate at all times the amount of water in the main casing, and the gage $h$ will indicate the steam-pressure occasioned by the steam generated in said casing, and the water of condensation from said steam flows back from the drum H into said main casing.

In Fig. 4 I have shown a form of apparatus in which two coils are employed, one within another, these coils being designated by the reference-letters $B^4$ and $B^5$, and these coils are placed one within another and connected with the tube portions $b$ and $b^2$ by T-heads L and $L^2$, respectively. Otherwise this construction is the same as that shown in Fig. 1, with the exception that a washer $l$ is preferably placed between the nut $C^3$ and the collar $a^4$, a similar washer $l^2$ between the nut $C^4$ and the collar $a^4$, and a similar washer $l^3$ between the nut $C^5$ and the collar $a^5$. This form of apparatus is employed where a large heating-surface is desired and the steam passes into both of the coils $B^4$ and $B^5$, and the water of condensation and exhaust-steam passes off through the pipe $d^4$ the same as in Fig. 1.

In Figs. 5 and 6 I have shown on an enlarged scale one method of making the connection with the pipe $b$ and the pipe $b^2$. The connection with the portion $b$ is shown in Fig. 5, and with this construction the steam-supply pipe D is provided at its lower end with a conical head $D^2$, which fits in the upper end of the screw-threaded portion of the pipe-section $b$. The construction shown in Fig. 6 is intended for the pipe portion $b^2$ and is different from that hereinbefore described and consists of a stuffing-box and gland, formed as shown, to receive the steam and drain communications $b^2$ and $d^4$.

In Figs. 7, 8, and 9 I have shown another modification, in which the main casing, composed of the parts A and $A^2$, is elongated, and two coils $B^6$ and $B^7$ are employed. These coils are placed in communication below the main casing by a drainage-pipe M, provided with a valve $m$, and at the top by a steam-supply pipe $m^2$, having a valve $m^3$. In this form of construction the steam is admitted to the coils $B^6$ and $B^7$ through the pipe $m^2$, and the water of condensation and exhaust-steam passes off through the pipe M. The main casing is also provided with a water-supply $m^4$, having a valve $m^5$, and with the gage F, which is placed in communication with the drum H by the pipe $f$, as in Fig. 2, and connected with the drum H at $m^6$ is a handling gear and sling $m^7$. The operation of this form of the apparatus is substantially the same as that hereinbefore described.

In each of the forms of construction shown and described the water to be evaporated is placed in the main casing containing the steam coil or coils, and upon evaporation it escapes into the drum, from which it is lead to a suitable container, and in each of said forms of construction the part $A^2$ of the main casing is detachable, and the coil or coils in said casing may be turned on their supports, the object of this construction being to facilitate the cleaning of said coils.

It will thus be seen that I accomplish the object of my invention by means of an apparatus which is simple in construction and operation and well adapted to accomplish the result for which it is intended, and it will be apparent that changes in and modifications of the construction herein described may be made without departing from the spirit of my invention or sacrificing its advantages.

Having fully described my invention, I claim as new and desire to secure by Letters Patent—

1. In an apparatus of the class described, a main casing arranged vertically and composed of two separable parts, a steam-coil mounted in and rotatable in one of said parts, substantially as shown and described.

2. In an apparatus of the class described, a main casing arranged vertically and composed of two separable parts, a steam-coil mounted in and rotatable in one of said parts, and a steam-drum mounted on said casing and in communication therewith, substantially as shown and described.

3. In an apparatus of the class described, a main casing arranged vertically and composed of two separable parts, a steam-coil mounted in and rotatable in one of said parts, and a steam-drum mounted on said casing and in communication therewith, said coil being provided with a steam supply and exhaust, substantially as shown and described.

4. In an apparatus of the class described, a main casing arranged vertically and composed of two separable parts, a steam-coil mounted in one of said parts and adapted to turn therein, a steam-supply connected with one end of said coil and an exhaust connected with the other end, a steam-drum mounted on said casing and in communication therewith, and a water-gage connected with said casing and said drum, said drum being also provided with a gage and safety-valve, substantially as shown and described.

5. In an apparatus of the class described, a main casing composed of two separable parts, a plurality of steam-coils arranged vertically in one of said parts and rotatable therein, a steam-supply connected with one of said coils, a drum connected with said casing and with which another of said steam-coils is connected, and a water-supply communicating with the main casing adjacent to the last-named coil, whereby the supply of water to the main casing is discharged upon said last-named coil, substantially as shown and described.

6. In an apparatus of the class described, a main casing composed of detachable parts, a plurality of steam-coils mounted therein, a drum mounted on said casing and communicating therewith, a steam-supply connected with one of said coils, the other coil being in communication with said drum, and a water-supply communicating with the main casing adjacent to said last-named coil, whereby the water-supply to the main casing is discharged upon said last-named coil, substantially as shown and described.

In testimony that I claim the foregoing as my invention I have signed my name, in presence of the subscribing witnesses, this 11th day of May, 1899.

JAMES DAVIE.

Witnesses:
ALEXANDER COULTER,
JAMES MCMILLAN.